United States Patent Office 2,698,838
Patented Jan. 4, 1955

2,698,838

HEAT RESISTANT OXALATE-ALKYD-ISOCYANATE CELLULAR PLASTICS

Eli Simon, Los Angeles, and Frank W. Thomas, Burbank, Calif., assignors to Lockheed Aircraft Corporation, Burbank, Calif.

No Drawing. Application September 23, 1950, Serial No. 186,500

11 Claims. (Cl. 260—2.5)

This invention relates to alkyd resin poly-isocyanate type cellular plastics and relates more particularly to foamed or cellular plastic materials of this kind characterized by increased strength and superior resistance to distortion at elevated temperatures.

In our Letters Patent 2,577,279, issued December 4, 1951, and filed June 25, 1948; 2,577,280, issued December 4, 1951, and filed September 18, 1948; 2,577,281, issued December 4, 1951, and filed October 15, 1948, and 2,591,884, issued April 8, 1952, and filed February 17, 1949, and in application Serial No. 44,993, filed August 18, 1948, now abandoned, we have disclosed alkyd resin poly-isocyanate plastics in which the component ingredients are simply mixed together, poured into place, and then allowed to react under atmospheric pressure and at room temperatures, with or without a post-cure at moderate temperatures, to form low density cellular plastic materials of substantial strength. While the physical strength of our prior materials in relation to their low densities was excellent, the materials were not particularly resistant to heat and tended to distort under load at temperatures in the region of, say, 200° F. Although this characteristic is not of any particular consequence in many applications, there are certain instances where it is highly desirable to employ a low density cellular plastic that has a higher resistance to distortion at elevated temperatures.

We have discovered that cellular alkyd resin-diisocyanate plastics having superior strength characteristics and materially increased resistance to distortion at elevated temperatures are obtained where the alkyd resin is an oxalate alkyd resin, that is a resin in which oxalic acid, either hydrate or anhydrous, is used directly in the esterification during the resin formation. It is, therefore, an object of the present invention to provide a high strength, low density alkyd resin-diisocyanate reaction product having superior resistance to distortion at increased temperatures characterized by the incorporation therein of an oxalate alkyd resin.

Another object of the invention is to provide an alkyd resin-diisocyanate cellular plastic formulation of the character described wherein the oxalate alkyd resin is compounded from the oxalic acid and one or more polyhydric alcohols; the oxalic acid and one or more other dibasic acids and one or more polyhydric alcohols or from such mixtures either oil modified, or not, as desired or as the conditions of intended use dictate. The invention contemplates the employment of the oxalic acid in the esterification during resin formation, either as the sole dibasic acid or with other dibasic acids and excellent results have been obtained where dimer acids or dimerized fatty acids are employed in the resin formulations.

Another object of the invention is to provide formulations for the production of alkyd resin-diisocyanate cellular plastics that may incorporate high molecular weight film-forming polymeric thermoplastic additives to serve as film stabilizers during the foaming reaction to obtain cellular plastic products of superior physical properties. Such additives maintain adequate cell-wall rigidity and elasticity during the reaction and yet provide the high plasticity essential to maximum expansion to eliminate to a large extent cell collapse and thereby assure the formation of strong, low-density foamaceous products. In addition to, or instead of the high molecular weight polymeric thermoplastic resin additives, one or more appropriate metallic leafing powders and/or one or more metallic soap powders may be included in the foam forming reactant mixture to aid in the foaming and cell forming reaction. In situations where it is desirable or important to produce flame resistant or self-extinguishing cellular plastic products, flame retardant additives such as allyl esters of aryl phosphonic acids may be included in the foam producing reactant mixture. These additives, such as diallyl phenyl phosphonate, bis(methallyl) benzenephosphonate and diallyl toluene phosphonate, not only render the products flame resistant and decrease flammability, but also materially decrease the density of the cellular products which is a totally unexpected function or property of the additives in this class of system or material.

A still further object of the invention is to provide a novel alkyd resin suitable for use in the preparation or production of alkyd resin-diisocyanate cellular plastic products characterized by the presence of oxalic acid and by the processing procedure in producing the resin. Contrary to the alkyd resin preparation processes of which we are aware, we have discovered that the oxalate alkyd resin is most successfully produced when the oxalic acid is used directly in the alkyd resin producing reaction and the reaction is carried out at an initial temperature of from 180 to 220° F. until the frothing ceases and then the "hold" or sustained temperature is maintained below 275° F., the temperature and the time of reaction depending to a considerable degree upon the speed and efficiency of the agitation of the reactants until the desired acid number is obtained.

Other features and advantages of the invention will become apparent from the following detailed description of typical formulations and products of the invention.

The invention provides, generally, the preparation of an oxalate alkyd resin, the mixing of the resin with a diisocyanate with or without additives such as high molecular weight thermoplastic film-forming polymeric resins, flame retardants, leafing powders, etc. and the subsequent pouring or application of the resultant reactant mixture to react at atmospheric pressure and temperature.

The alkyd resins employed in the reactant resin- diisocyanate systems are reactant products of one or more polyhydric alcohols, oxalic acid with or without other dibasic acids, and unmodified or modified with oil and other resins. The resins preferably have an acid number of from 5 to 175, a water content of from 0.1% to 5% by weight, and a ratio range of the hydroxyl groups to the carboxyl groups in the alkyd reactants of: from 3 hydroxyl (OOH):1 carboxyl(COOH) to 4 hydroxyl (OH):5 carboxyl(COOH). As previously noted, the oxalate alkyd resin may be prepared from oxalic acid and one or more polyhydric alcohols. Examples of the formulations for such resins are:

Resin 1:                                            Mols
    Oxalic acid _____ 2.5
    Trimethylol propane _____ 3.33

Resin 2:
    Oxalic acid _____ 2.5
    Trimethylol ethane _____ 3.33

Resin 3:
    Oxalic acid _____ 2.5
    Trimethylol propane _____ 2.33
    Ethylene glycol _____ 1.5

While the ratio range of the hydroxyl groups to the carboxyl groups of the alkyd resin reactants may be as above described, the above specific oxalate resins 1, 2 and 3 have a ratio of the OH groups to the COOH groups of their respective alkyd resin reactants of approximately 2 to 1 and may have an acid number of from 5 to 175.

Examples of the oxalate alkyd resins of the invention prepared from oxalic acid, other dibasic acids and polyhydric alcohols are as follows, the ratios of the OH groups to the COOH groups of the alkyd resin reactants of the respective resins being indicated:

Resin 1–B:                                   Mols
    Oxalic acid _____ 1
    Trimethylol propane _____ 4
    Phthalic anhydride _____ ½
    Adipic acid _____ 1
                    12(OH):5(COOH)

Resin 2–B:
- Oxalic acid _____ 1¾
- Trimethylol propane _____ 4
- Phthalic anhydride _____ ½
- Adipic acid _____ 1
    12(OH):6½(COOH)

Resin 3–B:
- Oxalic acid _____ 2
- Trimethylol propane _____ 4
- Phthalic anhydride _____ ½
- Adipic acid _____ 2
    12(OH):9(COOH)

Resin 4–B:
- Oxalic acid _____ 2½
- Trimethylol propane _____ 4
- Phthalic anhydride _____ ½
    2(OH):1(COOH)

Resin 5–B:
- Oxalic acid _____ 1½
- Trimethylol propane _____ 2⅔
- Phthalic anhydride _____ ½
- Adipic acid _____ 1
- Pentaerythritol _____ 1
    2(OH):1(COOH)

Resin 6–B:
- Oxalic acid _____ 2½
- Trimethylol propane _____ 2⅔
- Phthalic anhydride _____ ½
- Pentaerythritol _____ 1
    2(OH):1(COOH)

Resin 7–B:
- Oxalic acid _____ 2
- Trimethylol propane _____ 4
- Phthalic anhydride _____ 1
    2(OH):1(COOH)

Resin 8–B:
- Oxalic acid _____ 2½
- Trimethylol propane _____ 4
- Maleic anhydride _____ ½
    2(OH):1(COOH)

The following represent examples of oxalate alkyd resins prepared from oxalic acid and polyhydric alcohols and oil modified, the only dibasic acid employed being the oxalic acid:

Resin 1–C:                                       Mols
- Oxalic acid _____ 2
- Trimethylol propane _____ 4
- Dimer acids _____ 1
    2(OH):1(COOH)

Resin 2–C:
- Oxalic acid _____ 2½
- Trimethylol propane _____ 4
- Dimer acids _____ ½
    2(OH):1(COOH)

Resin 3–C:
- Oxalic acid _____ 2½
- Trimethylol propane _____ 3¾
- Dimer acids _____ ¼
    Approx. 2(OH):1(COOH)

Resin 4–C:
- Oxalic acid _____ 2½
- Trimethylol propane _____ 3⅝
- Dimer acids _____ ⅛
    Approx. 2(OH):1(COOH)

Resin 5–C:
- Oxalic acid _____ 2½
- Trimethylol propane _____ 3 9/16
- Dimer acids _____ 1/16
    Approx. 12(OH):5(COOH)

Resin 6–C:
- Oxalic acid _____ 2½
- Trimethylol propane _____ 3
- Glycerol _____ 1
- Dimer acids _____ ½
    2(OH):1(COOH)

Although the acid numbers of these resins, 1 to 6–C inclusive, may range between 5 and 175, the preferred acid number is between 10 and 20 and the water content may be between 0.1% and 5% by weight. The amount or proportion of the dimer acids employed in preparing the oxalate alkyd resin may vary considerably; for example in the resins of Examples 1–C to 6–C inclusive, from 1/64 to 1 mol of the dimer acids may be used. We have discovered that resin 3–C when incorporated or employed in the alkyd resin-diisocyanate reactant mixture contributes to the production of exceptionally good quality, extremely low density cellular plastics. This resin, 3–C, gives good results where the acid number is from 14 to 175 although this is not necessarily the limiting acid number range. Resin 5–C has been found to be practical and altogether effective in the alkyd resin-diisocyanate reactant mixture for producing heat resistant cellular plastics of superior physical strength characteristics.

The following are representative examples of oxalate alkyd resins useful in the production of the cellular alkyd resin-diisocyanate cellular plastics, the resins of this group being oil modified and prepared from oxalic acid, one or more additional dibasic acids and one or more polyhydric alcohols:

Resin 1–D:                                       Mols
- Oxalic acid _____ 1½
- Trimethylol propane _____ 3½
- Phthalic anhydride _____ ½
- Adipic acid _____ ½
- Pentaerythritol _____ ½
- Dimer acids _____ ¾
    Approx. 2(OH):1(COOH)

Resin 2–D:
- Oxalic acid _____ 2½
- Trimethylol propane _____ 4
- Phthalic anhydride _____ ½
- Dimer acids _____ ⅛
    Approx. 2(OH):1(COOH)

Resin 3–D:
- Oxalic acid _____ 2½
- Trimethylol propane _____ 3
- Ethylene glycol _____ 1½
- Maleic anhydride _____ ½
- Dimer acids _____ 1/32
    Approx. 2(OH):1(COOH)

Resin 4–D:
- Oxalic acid _____ 1½
- Trimethylol propane _____ 2⅔
- Phthalic anhydride _____ ½
- Adipic acid _____ 1
- Pentaerythritol _____ 1
- Dimer acids _____ 1/64
    Approx. 2(OH):1(COOH)

As in the other oxalate alkyd resin formulations, the acid number may range between 5 and 175 with the preferred acid number being between 10 and 20 and the dimer acid limits of the resins of this class, 1–D to 4–D inclusive, are from 1/64 to 1 mol.

In the preparation of the oxalate alkyd resins the component ingredients are first melted to a fluid condition at a low temperature, for example at a temperature below 220° F. The initial esterification reaction is carried out at a low temperature, for example at a temperature between 180 and 220° F. until the frothing ceases, it being our experience that the success in preparing the oxalate alkyd resin is the maintenance of the relatively low temperatures during the initial and sustained reaction periods. During the "hold" or sustained reaction following the initial frothing reaction the mix is maintained at a temperature of from 220 to 275° F. while rapidly agitating the same, this operation being continued until the desired acid number is obtained. While any selected type of agitation may be employed, we have found it practical to rapidly stir the reactants with an agitator driven by an electric motor while bubbling nitrogen, carbon dioxide, or the like, through the mix to maintain an inert atmosphere. We have observed that the efficiency of the agitation or stirring of the reacting mix determines the length of time required to obtain the desired acid number of the resin and that where the stirring or agitation is more efficient, a shorter period is required to reach the desired acid number. It is to be observed that whereas in the customary alkyd resin manufacturing techniques the temperatures of the mix during the reaction vary between 350° and 550° F. we successfully produce the oxalate alkyd resins with a reaction temperature in the neighborhood of 275° F. or lower, although we are unable to obtain a satisfactory oxalate alkyd resin by employing the normal or usual processing temperatures (350° F.).

The dimer acids or dimerized fatty acids included in certain of the above examples of the oxalated alkyd resins are dimeric polymers of unsaturated fatty acids such as dimerized linoleic or linolenic acids. These dimer acids may be prepared by heating the methyl esters of polyunsaturated acids such as linoleic or linolenic acids at high temperatures. This may be represented diagrammatically by a Diels-Alder reaction to form the dilinoleic acid (dibasic unsaturated acid) as follows:

2CH₃(CH₂)₅CH=CH—CH=CH(CH₂)₇COOH ⟶

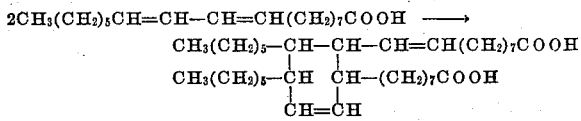

The poly isocyanate employed in preparing the reactant cellular plastic producing mixture is preferably meta-toluene diisocyanate. This diisocyanate is used in the proportion of from 35 to 150 grams for each 100 grams of the oxalate alkyd resin.

As described in our Patent No. 2,577,280, the inclusion of one or more metallic soap powders in the reactant alkyd resin-diisocyanate mixture produces a superior cellular plastic product. The metallic soap powders suitable for incorporation in the reactant mixture are metallic soap powders of fatty acids having from 12 to 20 carbon atoms such as:

Zinc stearate            Barium stearate
Aluminum stearate        Zinc laurate
Calcium stearate         Calcium oleate
Magnesium stearate       Strontium stearate
Magnesium hydroxy
  stearate The proportion of the metallic soap powder used may range from 1/16 to 7½ grams of the selected metallic soap powder or soap powders for each 30 grams of the alkyd resin.

The inclusion of one or more metallic leafing powders in the oxalate alkyd resin-poly isocyanate reactant mixture will result in a cellular plastic product of superior physical properties. Our copending application, Serial No. 44,993, describes the use of such metallic leafing powders in alkyd resin-poly isocyanate reactant mixtures. The metallic leafing powders must have the property of leafing when suspended in a liquid vehicle and when so suspended and applied as a paint have the ability of forming a continuous film on the surface of the applied liquid vehicle or paint. The metallic leafing powders which we have found to be effective in the formulations of the invention include:

Aluminum leafing powder     Lead leafing powder
Aluminum bronze leafing     Nickel leafing powder
  powder                    Silver leafing powder
Gold bronze leafing         Gold leafing powder
  powder                    Copper leafing powder
Copper bronze leafing       Stainless steel leafing
  powder                      powder Such metallic leafing powders are employed individually or in suitable mixtures and in the proportion of from 1/16 to 7½ grams for each 30 grams of the oxalate alkyd resin. Excellent results have been obtained by employing aluminum leafing powder of such fineness that not more than 2% is retained on a No. 325 sieve and by employing aluminum bronze leafing powder, gold bronze leafing powder, and copper bronze leafing powder of such fineness that not more than 0.3% is retained on a No. 100 sieve.

Excellent results are obtainable when both a metallic soap powder and a metallic leafing powder are incorporated in the oxalate alkyd resin-poly isocyanate mixture. Such a combination of fillers appears to act synergistically, that is the combination causes the formation of a greater volume of the cellular plastic than if the same proportionate quantity of each individual filler is used separately in the identical oxalate alkyd resin-poly isocyanate reactant mixture. When both the metallic leafing powders and the metallic soap powders are used in the formulations of the invention, the metallic leafing powder may be employed in the proportion of from 1/16 to 5 grams for each 30 grams of the alkyd resin and the metallic soap powder may be used in the proportion of from 1/16 to 5 grams for each gram of the alkyd resin.

Flame retardant additives may be added in the oxalated alkyd resin-poly isocyanate reactant mixture to render the cellular plastic products flame resistant and self-extinguishing when once ignited. The additives effective for this purpose are allyl esters of aryl phosphonic acids, namely compounds having the general formula ArPO(OCH₂CR:CHR¹)₂ where Ar represents aryl and alkaryl hydrocarbon radicals and R and R¹ are hydrogen and alkyl hydrocarbon radicals. Compounds of this nature are described in United States Letters Patent No. 2,425,765 granted August 19, 1947. Included in this group of compounds are:

1. Diallyl phenyl phosphonate—

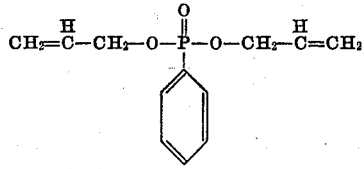

2. Bis(methallyl) benzenephosphonate—

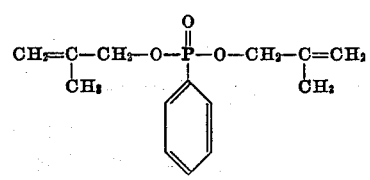

and,

3. Diallyl toluene phosphonate—

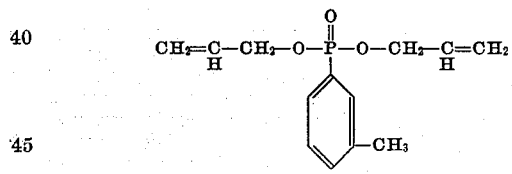

Quite unexpectedly these additives not only serve to impart flame resistance to, and to decrease flame propagation of, the foamed plastic product but also serve to materially decrease the density of the foamed material. In practice from 1 gram to 20 grams of the additive may be used with each 30 grams of the oxalate alkyd resin. It is usually preferred to employ approximately 5 grams of the additive for each 30 grams of the resin.

Other flame proofing and fire retardant agents may be employed instead of, or in addition to, the unsaturated alkyl esters of aryl phosphonic acids described above. Such agents include tri-chloralkyl phosphates of the general formula:

where R₁, R₂ and R₃ are alkyl groups having from 2 to 4 carbon atoms, antimony oxide Sb₂O₃ and allyl esters of alkenyl phosphonic acids of the class described in U. S. Letters Patent No. 2,425,766 issued August 19, 1947, namely compounds having the general formula:

R²R³C:CR⁴PO(OCH₂CR:CHR¹)₂ where R, R¹ and R⁴ are hydrogen or alkyl and R² and R³ are hydrogen, alkyl or aryl radicals. Examples of the tri-chloralkyl phosphates that are effective in the formulations of the invention are:

Tri-B-chlorethyl phosphate—

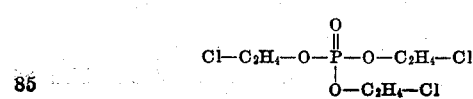

and

Tri-chloropropyl phosphate—

(Cl—C₃H₇—O)₃—PO

Examples of the allyl esters of alkenyl phosphonic acids which we have found to be practical and effective in the cellular plastic formulations are:

Diallyl isobutene phosphonate—

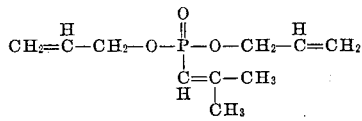

Diallyl styrene phosphonate—

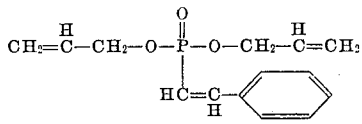

and

Bis(methallyl) styrene phosphonate—

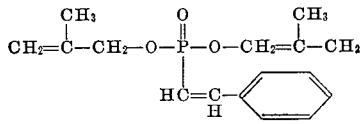

The allyl esters of aryl phosphonic acids, the allyl esters of alkenyl phosphonic acids and the tri-chloralkyl phosphates serve to facilitate mixing of the oxalate alkyd resins and the diisocyanate by acting as mutual solvents for both and this tends to avoid premature reaction prior to the final pouring of the reactant mixture. This is important as it permits the utilization of higher water content alkyd resins which may be employed when a reduced density foamed plastic product is desired. The antimony oxide in addition to serving as a flameproofing agent acts as a cell size regulator so that the cells of the foamed plastic may be of smaller size. The allyl esters of alkenyl phosphonic acids may be used in the proportion of from 1 to 20 grams for each 30 grams of the oxalate alkyd resin when employed without the allyl esters of aryl phosphonic acids previously named, and when the allyl esters of alkenyl phosphonic acids and the allyl esters of aryl phosphonic acids are both employed their total proportion may be from 1 to 20 grams for each 30 grams of the oxalate resin. The tri-chloralkyl phosphates may be used in the proportion of from ½ to 10 grams for each 30 grams of the alkyd resin and when used with the allyl esters of aryl phosphonic acids in the proportion above named, may be employed in the proportion of from ½ to 7½ grams for each 30 grams of the alkyd resin. The antimony oxide may be used in the proportion of from ¼ to 5 grams for each 30 grams of the alkyd resin with or without the addition of the allyl esters of aryl phosphonic acids or the tri-chloralkyl phosphates.

The invention contemplates the inclusion in the reactant mixture of one or more high molecular weight thermoplastic film-forming polymeric resin additives which stabilize the foam during the reaction, permit the use of higher water contents, increase the elasticity of the cell walls during the foaming of the reactant mixture and perform other functions productive of low density cellular plastics of superior physical properties. The resin additives are soluble in meta-toluene diisocyanate and may or may not react therewith. The following resin additives have each been found to be practical and effective in the alkyd resin-diisocyanate reactant systems of the invention and when employed in the concentration ranges set forth do not depend for their action upon the presence of other additives such as the metallic soap powders, the metallic leafing powders or the flame retardants which latter additives may or may not be included in the alkyd resin-meta-toluene diisocyanate mixture depending upon the intended character of the products and their application. In general, a concentration of the high molecular weight polymeric thermoplastic resin additives of approximately 2 grams for each 100 grams of the meta-toluene diisocyanate gives excellent results. We have found that for certain specific applications of the product 2 grams, 4 grams and 6 grams respectively, of the thermoplastic resin additive for each 100 grams of the metal-toluene diisocyanate are valuable in obtaining products of the desired physical properties and characteristics. It is to be understood that the concentrations or proportions of the individual additives depend to a considerable extent upon the nature of the additives and that the concentrations of the additives are somewhat dependant upon their respective viscosity grades. The film-forming and foam stabilizing resin additives contemplated by the invention include:

Ethyl cellulose
Chlorinated natural rubber
Benzyl cellulose
Natural rubber
Vinyl chloride-vinyl acetate copolymers
Polyvinyl chloride
Polyvinyl acetate
Polystyrene
Polydichloro styrene
Polymeric acrylate and methacrylate resins and their copolymers
Polyvinyl butyral Ethyl cellulose, which we have found to be particularly desirable in the formulations of the invention, is a cellulose ether obtained by the reaction of ethyl chloride with alkali cellulose as follows:

$$RONa + ClC_2H_5 \rightarrow ROC_2H_5 + NaCl$$

where R represents the cellulose radical. From the structure of the native cellulose

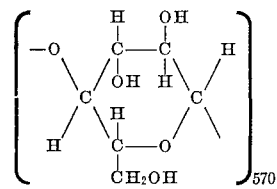

it is seen that each glucose unit has three replaceable OH groups, all or some of which may react as above to form the ether linkages. The molecular weight of ethyl cellulose is high since a cellulose molecule, having 570 recurring glucose units, has a molecular weight of about 130,000. Very satisfactory results have been obtained using commercial grades of ethyl cellulose resins wherein the substitution values are between 2.15 and 2.60 ethoxyl groups for each glucose unit, that is where the ethoxyl content is from 43% to 50%. The preferred ethoxyl content range of the ethyl cellulose resin is from 45.0 to 49.5%. The proportion or concentration of the ethyl cellulose in the reactant alkyd resin-meta-toluene diisocyanate systems of the invention is from 0.03 gram to 15 grams of the ethyl cellulose for each 100 grams of the meta-toluene diisocyanate, the preferred concentration of the ethyl cellulose being between ½ to 6 grams for each 100 grams of the meta-toluene diisocyanate. Very low concentrations of the ethyl cellulose are effective in producing low density foamed plastics having small uniform cells and superior physical characteristics. We believe that the particularly excellent results obtained with only small concentrations of the ethyl cellulose are accounted for, at least in part, by the reaction of the ethyl cellulose with the meta-toluene diisocyanate through addition polymerization between the labile hydrogen atoms of the free (OH) groups in the ethyl cellulose molecules and the isocyanate groups producing soluble, very high molecular weight reactive polyisocyanates. Such a reaction is illustrated as follows:

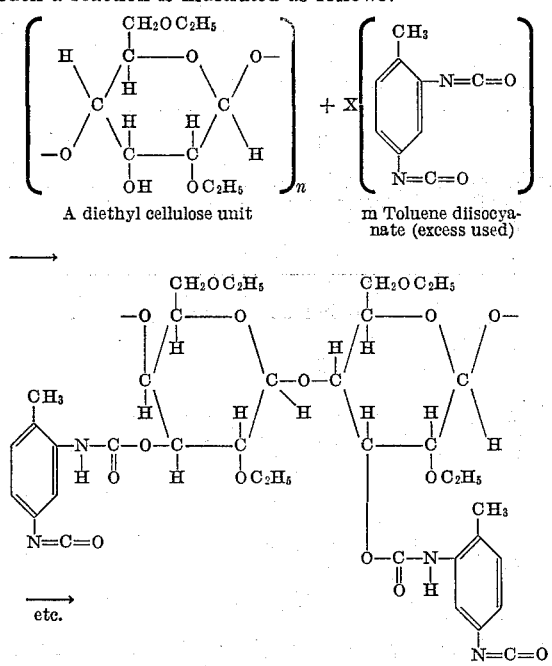

With the extremely low effective concentrations of the ethyl cellulose, for example 0.03 gram of the ethyl cellulose resin per 100 grams of the meta-toluene diisocyanate, it is evident that there is substantially no increase in viscosity of the mixture, particularly where low viscosity ethyl cellulose is used. The effect of the ethyl cellulose is, therefore, not to be ascribed to a viscosity increase but appears to be due to reinforcement and stabilization of the cells of the foaming reactant mixture preventing collapse of the cells and consequent loss of gas pressure. This is substantiated by the fact that an increase in viscosity of the reactant mixture by dissolving low molecular weight resins, and particularly those that are not predominantly linear such as ester gum or glycerol abietate, in the foaming mixture, with the foam stabilizers such as metallic soap, metallic leafing powder, omitted does not avoid cell collapse but results in a condition where cell collapse predominates due to insufficient cell reinforcement so that practically no plastic foam volume is obtained. The viscosity of the ethyl cellulose resins which we employ is between 7 and 200 centipoises, and preferably between 50 and 100 centipoises, this viscosity being determined from a 5% by weight concentration of the ethyl cellulose in a solution of from 70 to 80 parts by weight of toluene with from 30 to 20 parts by weight of ethanol (denatured 2B ethyl alcohol of 95% strength).

A comparison of the physical strengths of the cellular plastics prepared from non-oxalated alkyd resins and the oxalate resins of the invention demonstrates the marked advantages to be gained by employing the oxalate resins in the reactive cellular plastic producing formulations particularly where the products may be subjected to elevated temperatures. For example, let us consider the formula:

| | Parts by weight |
|---|---|
| Alykd resin | 30 |
| Meta-toluene diisocyanate containing 2% ethyl cellulose of 100 centipoises viscosity and of from 48.0 to 49.5% ethoxyl content | 20 |
| Diallyl phenyl phosphonate containing 5% benzoyl peroxide | 5 | where the resin has an acid number of 20 and is compounded from:

| | Mols |
|---|---|
| Trimethylol propane | 4 |
| Adipic acid | 2½ |
| Phthalic anhydride | ½ |

In actual compression tests of the reaction product of this formulation the compression strengths of the set cured cellular product having a density of 13 pounds per cubic foot and with the load applied perpendicular to the direction of foaming are 475 p. s. i. at 70° F. and 180 p. s. i. at 160° F. However, where the resin employed in this formulation is resin 4–B, instead of the above alkyd resin, and the load is applied in the same manner to the set cured product the compression strengths are 545 p. s. i. at 70° F. and 300 p. s. i. at 160° F. Again, where resin 5–C is substituted for the non-oxalate resin in the above formulation the set cured cellular reaction product of ten pounds per cubic foot density has a compression strength of 238 p. s. i. at 160° F. and a modulus (EX10³) of 8.7 at 160° F. while a set cured cellular reaction product prepared from the non-oxalate resin and having a density of 10 pounds per cubic foot has a compression strength of 110 p. s. i. at 160° F. and a modulus (EX10³) of 4 at the same temperature.

The following are typical preferred formulations of the invention, the parts of the components being in parts by weight:

Example A

| | Parts |
|---|---|
| Resin 5-C having an acid number of 20 | 30 |
| Meta-toluene diisocyanate containing 2% by weight ethyl cellulose of 100 centipoises viscosity and having an ethoxyl content of from 45.0% to 49.5% | 20 |
| Diallyl phenyl phosphonate containing 5% benzoyl peroxide | 5 |

Example B

| | Parts |
|---|---|
| Resin 5-C having an acid number of 20 | 30 |
| Zinc stearate | ½ |
| Diallyl phenyl phosphonate containing 5% dissolved benzoyl peroxide | 2½ |
| Meta-toluene diisocyanate containing 2% by weight ethyl cellulose of 100 centipoises viscosity and having an ethoxyl content of from 46.8 to 48.5% | 20 |

Example C

| | Parts |
|---|---|
| Resin 5-C having an acid number of 20 | 30 |
| Diallyl phenyl phosphonate containing 5% by weight dissolved benzoyl peroxide | 2½ |
| Meta-toluene diisocyanate containing 2% by weight ethyl cellulose having a viscosity of 100 centipoises and having an ethoxyl content of 48 to 49.5% | 15 |

Example D

| | Parts |
|---|---|
| Resin 5-C having an acid number of 20 | 30 |
| Aluminum leafing powder | 2½ |
| Meta-toluene diisocyanate containing 2% by weight ethyl cellulose having a viscosity of 100 centipoises and having an ethoxyl content of from 46.8 to 48.5% | 15 |

Example E

| | Parts |
|---|---|
| Resin 5-C having an acid number of 20 | 30 |
| Aluminum leafing powder | 2½ |
| Diallyl phenyl phosphonate containing 5% by weight dissolved benzoyl peroxide | 2½ |
| Meta-toluene diisocyanate | 17½ |

Example F

| | Parts |
|---|---|
| Resin 5-C having an acid number of 10 | 30 |
| Meta-toluene diisocyanate containing 2% by weight ethyl cellulose having a viscosity of 100 centipoies and having an ethoxyl content of from 48 to 49.5% | 20 |
| Diallyl phenyl phosphonate containing 5% by weight dissolved benzoyl peroxide | 2½ |

Example G

| | Parts |
|---|---|
| Resin 5-C having an acid number of 10 | 30 |
| Meta-toluene diisocyanate containing 2% by weight ethyl cellulose having a viscosity of 100 centipoises and having an ethoxyl content of from 48 to 49.5% | 25 |
| Diallyl phenyl phosphonate containing 5% by weight dissolved benzoyl peroxide | 2½ |

Example H

| | Parts |
|---|---|
| Resin 5-C having an acid number of 10 | 30 |
| Aluminum leafing powder | 2½ |
| Meta-toluene diisocyanate | 25 |

Example I

| | Parts |
|---|---|
| Resin 5-C having an acid number of 10 | 30 |
| Aluminum leafing powder | 2½ |
| Diallyl phenyl phosphonate containing 5% by weight dissolved benzoyl peroxide | 2½ |
| Meta-toluene diisocyanate containing 2% by weight ethyl cellulose having a viscosity of 100 centipoises and having an ethoxyl content of from 46.8 to 48.5% | 20 |

Example J

| | Parts |
|---|---|
| Resin 5-C having an acid number of 15 | 30 |
| Aluminum leafing powder | 5 |
| Meta-toluene diisocyanate | 20 |
| Antimony oxide | 2½ |
| Tri-B-chlorethyl phosphate | 2½ |

Example K

| | Parts |
|---|---|
| Resin 5-C having an acid number of 15 | 30 |
| Aluminum leafing powder | 2½ |
| Zinc stearate | ¼ |
| Meta-toluene diisocyanate containing 2% by weight ethyl cellulose of 100 centipoises viscosity and having an ethoxyl content of from 45% to 49% | 20 |
| Diallyl phenyl phosphonate containing 5% dissolved benzoyl peroxide | 2½ |

Example L

| | Parts |
|---|---|
| Resin 5-C having an acid number of 20 | 30 |
| Meta-toluene diisocyanate containing 2% by weight ethyl cellulose of 100 centipoises viscosity and having an ethoxyl content of from 45% to 49.5% | 20 |

Example M

| | Parts |
|---|---|
| Resin 5-C having an acid number of 20 | 30 |
| Diallyl phenyl phosphonate containing 5% dissolved benzoyl peroxide | 2½ |
| Meta-toluene diisocyanate containing 4% by weight ethyl cellulose having a viscosity of 100 centipoises and having an ethoxyl content of from 46.8 to 48.5% | 15 |

Example N

| | Parts |
|---|---|
| Resin 5-C having an acid number of 20 | 30 |
| Aluminum leafing powder | 1½ |
| Meta-toluene diisocyanate containing ½% by weight ethyl cellulose having a viscosity of 100 centipoises and an ethoxyl content of from 45 to 49.5% | 20 |
| Diallyl phenyl phosphonate containing 5% dissolved benzoyl peroxide | 5 |

Example O

| | Parts |
|---|---|
| Resin 5-C having an acid number of 10 | 30 |
| Aluminum leafing powder | 2½ |
| Meta-toluene diisocyanate | 20 |

Example P

| | Parts |
|---|---|
| Resin 3-C having an acid number of 65 | 30 |
| Meta-toluene diisocyanate containing 2% by weight ethyl cellulose having a viscosity of 100 centipoises and an ethoxyl content of from 48 to 49.5% | 20 |
| Diallyl phenyl phosphonate containing 5% by weight dissolved benzoyl peroxide | 5 |

Example Q

| | Parts |
|---|---|
| Resin 3-C having an acid number of 20 | 30 |
| Meta-toluene diisocyanate containing 6% by weight ethyl cellulose having a viscosity of 100 centipoises and an ethoxyl content of from 48 to 49.5% | 20 |
| Antimony oxide | 2½ |
| Tri-B-chlorethyl phosphate | 2½ |

Example R

| | Parts |
|---|---|
| Resin 1 having an acid number of 60 | 30 |
| Meta-toluene diisocyanate containing 2% by weight ethyl cellulose having a viscosity of 100 centipoises and an ethoxyl content of from 46.8 to 48.5% | 20 |

Example S

| | Parts |
|---|---|
| Resin 4-B having an acid number of 100 | 30 |
| Meta-toluene diisocyanate containing 4% by weight ethyl cellulose having a viscosity of 100 centipoises and an ethoxyl content of from 45 to 49.5% | 20 |
| Aluminum leafing powder | 2½ |
| Diallyl phenyl phosphonate containing 5% by weight of dissolved benzoyl peroxide | 5 |

Example T

| | Parts |
|---|---|
| Resin 4-B having an acid number of 25 | 30 |
| Meta-toluene diisocyanate containing 2% by weight ethyl cellulose having a viscosity of 100 centipoises and having an ethoxyl content of from 45 to 49.5% | 20 |
| Antimony oxide | 2½ |
| Diallyl phenyl phosphonate containing 5% by weight of dissolved benzoyl peroxide | 5 |

Example U

| | Parts |
|---|---|
| Resin 8-B having an acid number of 50 | 30 |
| Meta-toluene diisocyanate containing 2% by weight ethyl cellulose having a viscosity of 100 centipoises and an ethoxyl content of from 45 to 49.5% | 20 |

Example V

| | Parts |
|---|---|
| Resin 8-B having an acid number of 30 | 30 |
| Meta-toluene diisocyanate | 20 |
| Zinc stearate | 2½ |

Example W

| | Parts |
|---|---|
| Resin 8-B having an acid number of 25 | 30 |
| Meta-toluene diisocyanate | 20 |
| Zinc stearate | ¼ |
| Aluminum leafing powder | 2½ |

Example X

| | Parts |
|---|---|
| Resin 1-D having an acid number of 75 | 30 |
| Meta-toluene diisocyanate containing 1% ethyl cellulose having a viscosity of 100 centipoises and having an ethoxyl content of from 45 to 49.5% | 20 |
| Zinc stearate | ¼ |
| Aluminum leafing powder | 2 |
| Diallyl phenyl phosphonate containing 5% by weight dissolved benzoyl peroxide | 2½ |
| Antimony oxide | 2½ |

Example Y

| | Parts |
|---|---|
| Resin 3-C having an acid number of 20 | 30 |
| Meta-toluene diisocyanate containing 10% by weight of polymeric chlorinated natural rubber having a viscosity of 500 centipoises | 20 |
| Copper leafing powder | 4 |

Example Z

| | Parts |
|---|---|
| Resin 2-B having an acid number of 20 | 30 |
| Meta-toluene diisocyanate containing ½% by weight of polymeric methylmethacrylate resin | 20 |
| Diallyl phenyl phosphonate containing 5% by weight dissolved benzoyl peroxide | 2½ |
| Magnesium hydroxy stearate | ½ |

In the production of the cellular plastic materials or products in accordance with the invention, the selected ingredients are simply mixed together thoroughly in the ratio designed to produce a foamed plastic having the desired density and other physical characteristics. The resultant mixture is then poured into the mold or cavity in the structure in which it is to form a part or is applied to a structural surface or the like. The reactant mixture is allowed to react at atmospheric pressure either with or without the application of external heat or attended by a moderate heating of, say, between 120° F. and 150° F. depending upon the size of the batch, etc. The reaction is allowed to go on to completion to produce the foamed cellular material. The cellular plastic product may then be subjected to a post-cure of from 10 to 20 hours at a temperature of from 125° F. to 225° F. to continue the polymerization of the reaction and thus obtain a stronger and more solvent resistant material. The plastic firmly and uniformly adheres to the surfaces of practically any solid material during the foaming reaction and retains its adherence when it has set and cured. As pointed out above, where the cellular plastic products or materials of this invention are to be employed in situations where they may be subjected to elevated temperatures, formulations may be selected which produce products that are resistant to heat and remain hard and resistant to distortion at temperatures of 300° F. or higher. The foamed cellular plastic materials have small cells that are generally spherical in configuration and that are non-communicating, the cells being uniformly distributed throughout the mass.

It should be understood that the invention is not based upon or dependent upon the theories which we have herein expressed. Nor is the invention to be regarded as limited to the express procedure or materials set forth, these details being given only by way of illustration. We do not regard such specific details as essential to the invention except insofar as they may be expressed by way of limitation in the following claims, wherein it is our intention to claim all novelty inherent in the invention as broadly as is permissible in view of the prior art.

We claim:

1. The cellular reaction product of an alkyd resin prepared from oxalic acid and a polyhydric alcohol reacted at temperatures below 275° F. to have an acid number of from 5 to 175 and wherein the hydroxyl groups and carboxyl groups of the alkyd resin reactants are in the ratio range of from 3(OH):1(COOH) to 4(OH):5(COOH), from 35 to 150 parts by weight of meta-toluene diisocyanate for each 100 parts by weight of said resin, and from .03 part to 15 parts by weight for each 100 parts by weight of the meta-toluene diisocyanate of a film-forming and foam stabilizing thermoplastic resin additive that is soluble in the meta-toluene diisocyanate, selected from the group consisting of:

Ethyl cellulose
Chlorinated natural rubber
Benzyl cellulose
Natural rubber
Vinyl chloride-vinyl acetate copolymers
Polyvinyl chloride
Polyvinyl acetate
Polystyrene
Polydichloro styrene
Polymeric methyl methacrylate
Polyvinyl butyral 2. The cellular reaction product of an alkyd resin prepared from oxalic acid and a polyhydric alcohol reacted at temperatures below 275° F. to have an acid number of from 5 to 175 and wherein the hydroxyl groups and carboxyl groups of the alkyd resin reactants are in the ratio range of from 3(OH):1(COOH) to 4(OH):5(COOH), from 35 to 150 parts by weight of meta-toluene diisocyanate for each 100 parts by weight of said resin and from 1/16 gram to 7.5 grams for each 30 grams of said resin and of metallic leafing powder, selected from the group consisting of:

Aluminum leafing powder
Lead leafing powder
Nickel leafing powder
Silver leafing powder
Gold leafing powder
Copper leafing powder
Stainless steel leafing powder
Aluminum bronze leafing powder
Gold bronze leafing powder
Copper bronze leafing powder 3. The cellular reaction product of an alkyd resin having a water content of from 0.1% to 5% by weight and reacted at temperatures below 275° F. to have an acid number of from 5 to 175 prepared from approximately 2.5 mols oxalic acid, approximately, 3.5 mols trimethylol propane and approximately 1/16 mol of a dimer of an unsaturated fatty acid selected from the group consisting of linoleic and linolenic acids, from 35 to 150 parts by weight of meta-toluene diisocyanate for each 100 parts by weight of said resin, and from .03 gram to 15 grams for each 100 grams of the meta-toluene diisocyanate of a film-forming and foam stabilizing thermoplastic resin additive that is soluble in meta-toluene diisocyanate, selected from a group consisting of:

Ethyl cellulose
Chlorinated natural rubber
Benzyl cellulose
Natural rubber
Vinyl chloride-vinyl acetate copolymers
Polyvinyl chloride
Polyvinyl acetate
Polystyrene
Polydichloro styrene
Polymeric methyl methacrylate
Polyvinyl butyral 4. The cellular reaction product of an alkyd resin having a water content of from 0.1% to 5% by weight and reacted at temperatures below 275° F. to have an acid number of from 5 to 175 prepared from approximately 2.5 mols oxalic acid, approximately 3 9/16 mols trimethylol propane and approximately 1/16 mol of a dimer of an unsaturated fatty acid selected from the group consisting of linoleic and linolenic acid, from 35 to 150 parts by weight of meta-toluene diisocyanate for each 100 parts by weight of said resin, and from 1/16 gram to 7.5 grams for each 30 grams of said resin of metallic leafing powder selected from the group consisting of:

Aluminum leafing powder
Lead leafing powder
Nickel leafing powder
Silver leafing powder
Gold leafing powder
Copper leafing powder
Stainless steel leafing powder
Aluminum bronze leafing powder
Gold bronze leafing powder
Copper bronze leafing powder 5. The cellular reaction product of approximately 30 parts of an alkyd resin having a water content of from 0.1% to 5% by weight and reacted at temperatures below 275° F. to have an acid number of from 5 to 175 prepared from 2.5 mols oxalic acid, 3 9/16 mols trimethylol propane and 1/16 mol of a dimer of an unsaturated fatty acid selected from the group consisting of linoleic and linolenic acids, 25 parts of meta-toluene diisocyanate containing from .03% to 15% by weight of ethyl cellulose, and 2½ parts diallyl phenyl phosphonate containing 5% by weight of benzoyl peroxide.

6. The cellular reaction product of approximately 30 parts of an alkyd resin having a water content of from 0.1% to 5% by weight and reacted at temperatures below 275° F. to have an acid number of from 5 to 175 prepared from 2.5 mols oxalic acid, 3 9/16 mols trimethylol propane and 1/16 mol of a dimer of an unsaturated fatty acid selected from the group consisting of linoleic and linolenic acids, 25 parts of meta-toluene diisocyanate containing from .03% to 15% by weight of ethyl cellulose, and 2½ parts metallic leafing powder, selected from the group consisting of:

Aluminum leafing powder
Lead leafing powder
Nickel leafing powder
Silver leafing powder
Gold leafing powder
Copper leafing powder
Stainless steel leafing powder
Aluminum bronze leafing powder
Gold bronze leafing powder
Copper bronze leafing powder 7. The cellular reaction product of approximately 30 parts of an alkyd resin having a water content of from 0.1% to 5% by weight and reacted at temperatures below 275° F. to have an acid number of from 5 to 175 prepared from 2.5 mols oxalic acid, 3 9/16 mols trimethylol propane and 1/16 mol of a dimer of an unsaturated fatty acid selected from the group consisting of linoleic and linolenic acids, 25 parts of meta-toluene diisocyanate containing from .03% to 15% by weight of ethyl cellulose, 2½ parts metallic leafing powder, selected from the group consisting of:

Aluminum leafing powder
Lead leafing powder
Nickel leafing powder
Silver leafing powder
Gold leafing powder
Copper leafing powder
Stainless steel leafing powder
Aluminum bronze leafing powder
Gold bronze leafing powder
Copper bronze leafing powder and 2½ parts diallyl phenyl phosphonate containing 5% by weight of benzoyl peroxide.

8. The cellular reaction product of an alkyd resin prepared from oxalic acid and a polyhydric alcohol reacted at temperatures below 275° F. to have an acid number of from 5 to 175 and wherein the hydroxyl groups and the carboxyl groups of the alkyd reactants are in the ratio range of from 3(OH):1(COOH) to 4(OH) to 5(COOH), from 35 to 150 parts by weight of meta-toluene diisocyanate for each 100 parts by weight of said resin, and from 1/16 part to 7.5 parts for each 30 parts of said resin of metallic soap powder selected from the group consisting of:

| | |
|---|---|
| Zinc stearate | Strontium stearate |
| Aluminum stearate | Magnesium hydroxide stearate |
| Calcium stearate | |
| Magnesium stearate | Zinc laurate |
| Barium stearate | Calcium oleate |

9. The cellular reaction product of an alkyd resin prepared from oxalic acid and a polyhydric alcohol reacted at temperatures below 275° F. to have an acid number of from 5 to 175 and wherein the hydroxyl groups and the carboxyl groups of the alkyd reactants are in the ratio range of from 3(OH):1(COOH) to 4(OH) to 5(COOH), from 35 to 150 parts by weight of meta-toluene diisocyanate for each 100 parts by weight of said resin, and from 1/16 to 5 parts by weight of metallic soap powder for each 30 parts by weight of said resin selected from the group consisting of:

| | |
|---|---|
| Zinc stearate | Strontium stearate |
| Aluminum stearate | Magnesium hydroxide stearate |
| Calcium stearate | |
| Magnesium stearate | Zinc laurate |
| Barium stearate | Calcium oleate |

10. The cellular reaction product of an alkyd resin prepared from oxalic acid and a polyhydric alcohol reacted at a temperature below 275° F. to have an acid number of from 5 to 175 and wherein the hydroxyl groups and the carboxyl groups of the alkyd reactants are in the ratio range of from 3(OH):1(COOH) to 4(OH) to 5(COOH), from 35 to 150 parts by weight of meta-toluene diisocyanate for each 100 parts by weight of said resin, and from .03 part by weight to 15 parts by weight of ethyl cellulose having an ethoxyl content of from 45.0 to 49.5% for each 100 parts by weight of said meta-toluene diisocyanate, the ethyl cellulose being soluble in the meta-toluene diisocyanate.

11. The cellular reaction product of an alkyd resin prepared from oxalic acid and a polyhydric alcohol reacted at temperatures below 275° F. to have an acid number of from 5 to 175 and wherein the hydroxyl groups and the carboxyl groups of the alkyd reactants are in the ratio range of from 3(OH):1(COOH) to 4(OH) to 5(COOH), from 35 to 150 parts by weight of meta-toluene diisocyanate for each 100 parts by weight of said resin, from .03 part by weight to 15 parts by weight of ethyl cellulose having an ethoxyl content of from 45.0 to 49.5% and soluble in the meta-toluene diisocyanate for each 100 parts of the meta-toluene diisocyanate, and from 1 to 20 grams for each 30 grams of said resin of a flame retardant additive chosen from the group consisting of:

Diallyl phenyl phosphonate
Bis (methallyl) benzene phosphonate
Diallyl toluene phosphonate
Allyl esters of alkenyl phosphonic acids References Cited in the file of this patent
UNITED STATES PATENTS

| | | |
|---|---|---|
| 1,108,332 | Callahan | Aug. 25, 1914 |
| 1,141,944 | Dawson | June 8, 1915 |
| 1,950,468 | Zwilgmeyer | Mar. 13, 1934 |
| 2,111,762 | Ellis | Mar. 22, 1938 |
| 2,491,811 | Ham | Dec. 20, 1949 |
| 2,498,621 | Kropa | Feb. 21, 1950 |
| 2,529,512 | Ott | Nov. 14, 1950 |
| 2,577,281 | Simon et al. | Dec. 4, 1951 |
| 2,591,884 | Simon et al. | Apr. 8, 1952 |
| 2,602,783 | Simon et al. | July 8, 1952 |